United States Patent [19]
Sato

[11] Patent Number: 5,860,123
[45] Date of Patent: Jan. 12, 1999

[54] ONE-CHIP CPU

[75] Inventor: Osamu Sato, Tokyo, Japan

[73] Assignee: NEC Corporation, Tokyo, Japan

[21] Appl. No.: 638,825

[22] Filed: Apr. 29, 1996

[30] Foreign Application Priority Data

May 1, 1995 [JP] Japan ................................. 7-107540

[51] Int. Cl.⁶ .................................................. G06F 12/14
[52] U.S. Cl. ..................... 711/163; 395/800.32; 395/186
[58] Field of Search .............................. 395/186, 800.32, 395/800.43; 711/163, 164; 380/3, 4

[56] References Cited

U.S. PATENT DOCUMENTS

| | | | |
|---|---|---|---|
| 4,184,201 | 1/1980 | Melberg et al. | 395/856 |
| 4,521,852 | 6/1985 | Guttag | 395/490 |
| 4,843,026 | 6/1989 | Ong et al. | 438/130 |
| 5,067,077 | 11/1991 | Wakimoto et al. | 711/163 |
| 5,355,466 | 10/1994 | Iwamoto | 395/288 |
| 5,361,341 | 11/1994 | Sourgen et al. | 395/185.01 |
| 5,384,749 | 1/1995 | Lisart et al. | 365/230.01 |
| 5,432,950 | 7/1995 | Sibigtroth | 711/163 |
| 5,557,743 | 9/1996 | Pombo et al. | 395/186 |
| 5,600,818 | 2/1997 | Weikmann | 711/163 |
| 5,680,581 | 10/1997 | Banno et al. | 395/186 |

FOREIGN PATENT DOCUMENTS

| | | |
|---|---|---|
| 0 308 219 | 3/1989 | European Pat. Off. . |
| 0 331 407 | 9/1989 | European Pat. Off. . |
| 0 502 532 | 9/1992 | European Pat. Off. . |
| 0 661 642 | 7/1995 | European Pat. Off. . |
| 1-232452 | 9/1989 | Japan . |
| 2 232 281 | 12/1990 | United Kingdom . |
| WO 93/10498 | 5/1993 | WIPO . |

*Primary Examiner*—Larry D. Donaghue
*Assistant Examiner*—Walter D. Davis, Jr.
*Attorney, Agent, or Firm*—Young & Thompson

[57] ABSTRACT

A one-chip CPU (Central Processing Unit) includes a program counter, a built-in inside memory, a gate circuit, a decode circuit, and an inside bus. The program counter is connected to the inside bus and built-in memory while the memory is connected to the decode circuit via the gate circuit. Further, the program counter is connected to the gate circuit. When the logical value of the program counter is representative of the built-in memory, an inhibit signal is not fed to the gate circuit. However, when the logical level is representative of an outside memory, the inhibit signal is fed to the gate circuit so as to close it. As a result, the gate circuit obstructs the flow of data from the built-in memory. This protects data stored in the built-in memory from illicit access.

4 Claims, 3 Drawing Sheets

ONE-CHIP CPU

BACKGROUND OF THE INVENTION

The present invention relates to a one-chip CPU (Central Processing Unit) having a memory thereinside and, more particularly, to a CPU capable of protecting data stored in the memory from illicit accesses from the outside.

A CPU having a ROM (Read Only Memory) and a RAM random Access Memory) thereinside is extensively used today. The ROM and RAM store a program and data, respectively. Most of conventional CPUs are small scale and are used as substitutes for control circuits due to their miniature and inexpensive configuration. However, advanced one-chip CPUs derived from improved CPU technologies are designed for large-scale data processing and control applications and need a large capacity program. To store the large capacity program, an arrangement wherein an outside memory is connected to the CPU by a bus is spreading. For example, an H8 series (trade name) available from Hitachi (Japan) and a 78K4 series (trade name) available from NEC (Japan) allow large-capacity outside memories to be connected thereto despite that they are one-chip CPUs. This, coupled with the sufficient ability available with such CPUs, has already realized their application to (digital cellular) handy phones, facsimile apparatuses and other equipment having complicated functions.

However, the problem with the conventional CPU having the outside memory connected thereto is that the third party can easily access the memory and illicitly know data stored in the memory. In light of this, important data are often stored in a ROM built in the CPU. It is therefore necessary to protect the data stored in the built-in ROM from illicit accesses from the outside.

Japanese Patent Laid-Open Publication No. 1-232452, for example, discloses an implementation for preventing data from being read out of an EPROM (Erasable Programmable ROM by read pulses fed from the outside. However, in the case of an EPROM, stored data are prevented from being read out by outside read pulses which are used for confirmation after the storage of a program. For example, if an external ROM storing a program for dumping the data of the built-in ROM is connected to the built-in ROM, then the CPU executes the program and causes the data to be illicitly read out of the built-in ROM.

SUMMARY OF THE INVENTION

It is therefore an object of the present invention to provide a one-chip CPU capable of protecting its built-in memory from illicit accesses.

In accordance with the present invention, in a one-chip CPU having a built-in memory, an access to the built-in memory is inhibited while a program stored in an outside memory is in execution.

Also, in accordance with the present invention, a one-chip CPU has at least a processor and a built-in memory implemented as a single package, a bus for connecting the processor and an outside memory, and a control circuit for inhibiting an access to the built-in memory when a program counter included in the processor designates the address of the outside memory.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
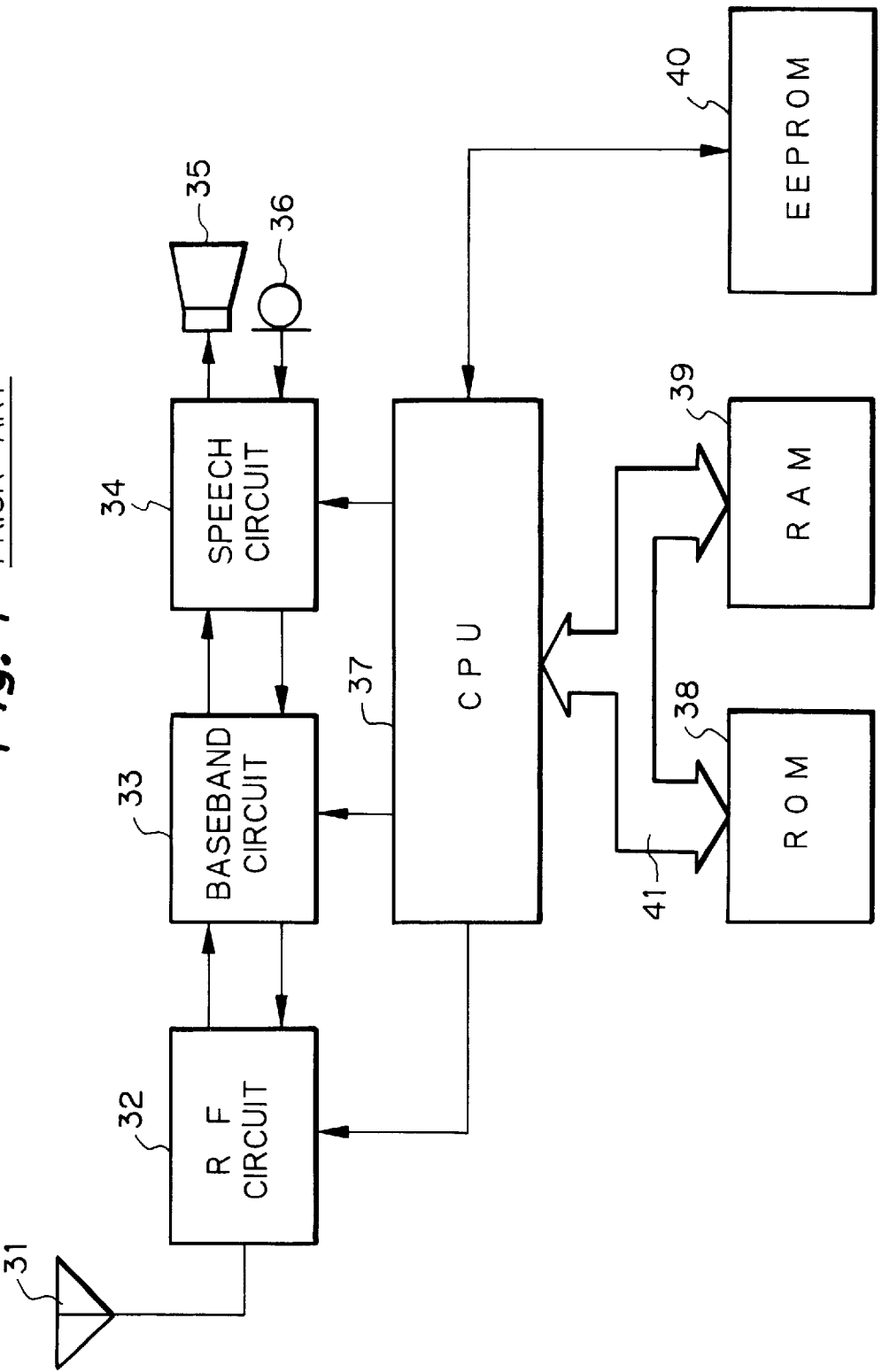
FIG. 1 is a block diagram schematically showing a conventional handy phone with a one-chip CPU.

To better understand the present invention, a brief reference will be made to a conventional handy phone with a one-chip CPU, shown in FIG. 1. As shown, the handy phone has a radio or RF (Radio Frequency) circuit 32 connected to an antenna 31. The RF circuit 32 interchanges signals with a base station over a radio channel via the antenna 31. A baseband circuit 33 intervenes between the RF circuit 32 and a speech circuit 34 in order to convert signals input and output from the circuits 32 and 34, as indicated by arrows in FIG. 1. Specifically, the speech circuit 34 amplifies a speech signal output from a microphone 36 and feeds the amplified signal to the baseband circuit 33. Also, the speech circuit 34 amplifies a received speech signal output from the baseband circuit 33 and drives a speaker 35 with the amplified signal. A one-chip CPU 37 controls all of these circuits 32, 33 and 34. In the specific configuration, the CPU 37 has a ROM and a RAM thereinside and is connected to a ROM 38 and a RAM 39 by a bus 41. In addition, the CPU 37 is connected to an EEPROM 40 at its I/O (Input/Output) port. The EEPROM 40 stores a subscriber number (phone number) assigned to the handy phone, a dial memory, and adjustment data for the RF circuit 32 and speech circuit 34. When the handy phone is powered-up, the CPU 37 reads the adjustment data out of the EEPROM 40 and feeds them to the RF circuit 32 and speech circuit 34. As a result, the circuits 32 and 34 are each initialized in the respective condition.

The adjustment data or values stored in the EEPROM 40 further include important data relating to the radio channel, e.g., data for adjusting the transmission output of the RF circuit 32. If a third party writes data exceeding a legal output in the EEPROM 40, then the RF circuit 32 will output the illegal data with its inherent problems, such as interference with the other channels. It is therefore preferable that such important data be written to the EEPROM 40 in the form of code and decoded every time they are read out. Some modern handy phones are provided with key switches for inputting a code number, so that they cannot be used by unauthorized persons unless a code number is input. The code number is also coded and then stored in the EEPROM 40.

However, even the advanced handy phone with the key switches has a problem that once the coding algorithm is decoded by the third party, the above important data are read out and the phone may be used illicitly. In light of this, it is a common practice to store a program for coding, e.g., the adjustment data and code number relating to a utility apparatus and user's security, and an initial loader for loading a program from the outside of the phone or similar software portion in the built-in ROM of the CPU 37, as distinguished from the outside memory which is easy to access from the outside. A satisfactory implementation for protecting such important program stored in the built-in ROM has not been reported yet.

Figure 2:
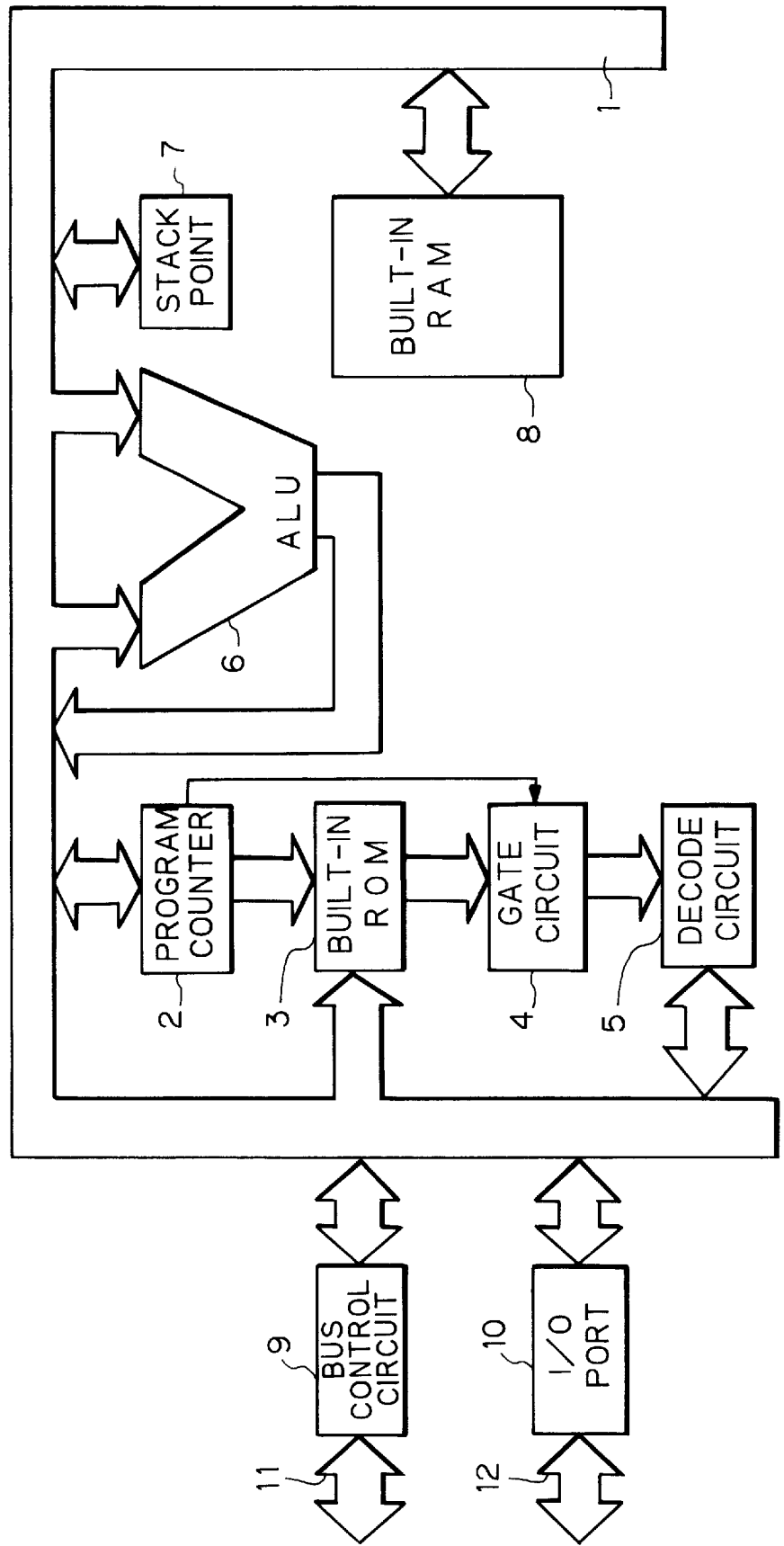
FIG. 2 is a block diagram schematically showing a one-chip CPU embodying the present invention.

Referring to FIG. 2, a one-chip CPU embodying the present invention is shown. As shown, the CPU has a program counter 2 connected to a bus 1 and a ROM 3 built in the CPU. When the program counter 2 designates the address of the built-in ROM 3, the CPU directly accesses the ROM 3. On the other hand, when the program counter 2 designates the address of an outside memory, not shown, the CPU accesses the outside memory via the built-in bus 1, a bus control circuit 9, and an outside bus 11. Data read out of the ROM 3 are fed to a decode circuit 5 via a gate circuit 4 while data read out of the outside memory are fed to the decode circuit 5 via the outside bus 11, bus control circuit 9, and inside bus 1. If the data are input to the decode circuit 5 at the cycle of a command, the circuit 5 executes a command; if otherwise, the circuit 5 transfers the input data to the bus 1 as inside data or an address. The gate circuit 4 is connected to the program counter 2. When the program counter 2 designates the address of the outside memory, it feeds an inhibit signal to the gate circuit 4. When the counter 2 designates the address of the ROM 3, the counter 2 does not apply the inhibit signal to the gate 4 circuit.

When a memory reference command is executed and if the addresses of the built-in memory ROM 3 are referenced, data read out of the ROM 3 are fed to the inside bus 1 via the gate circuit 4 and decode circuit 5. If the addresses of the outside memory are referenced, data read out of the outside memory are routed through the outside bus 11 and bus control circuit 9 to the inside bus 1. The bus 1 transfers the data to an arithmetic and logic unit (ALU) 6 or a built-in RAM 8.

Assume that the program counter 2 designates the address of the outside memory, and that the data received from the outside memory are representative of an outside memory reference command. Then, the decode circuit 5 delivers the address to be referenced to the inside bus 1. In response, data read out of the outside memory are fed to the inside bus 1 via the outside bus 11 and bus control circuit 9. In this case, the data are safely read out because they are free from the influence of the gate circuit 4.

On the other hand, assume that the data received from the outside memory are representative of a memory reference command, but the addresses of the built-in memory 3 are designated. Then, the program counter 2 feeds the inhibit signal to the gate 4 circuit and causes it to block the flow of data. As a result, data read out of the ROM 3 are prevented from reaching the decode circuit 5. This inhibits the data of the ROM 3 from being read out by a program stored in the outside memory.

In FIG. 2, there are also shown a stack point 7, an I/O port 10, and another outside bus 12 connected to the I/O port 10.

Figure 3:
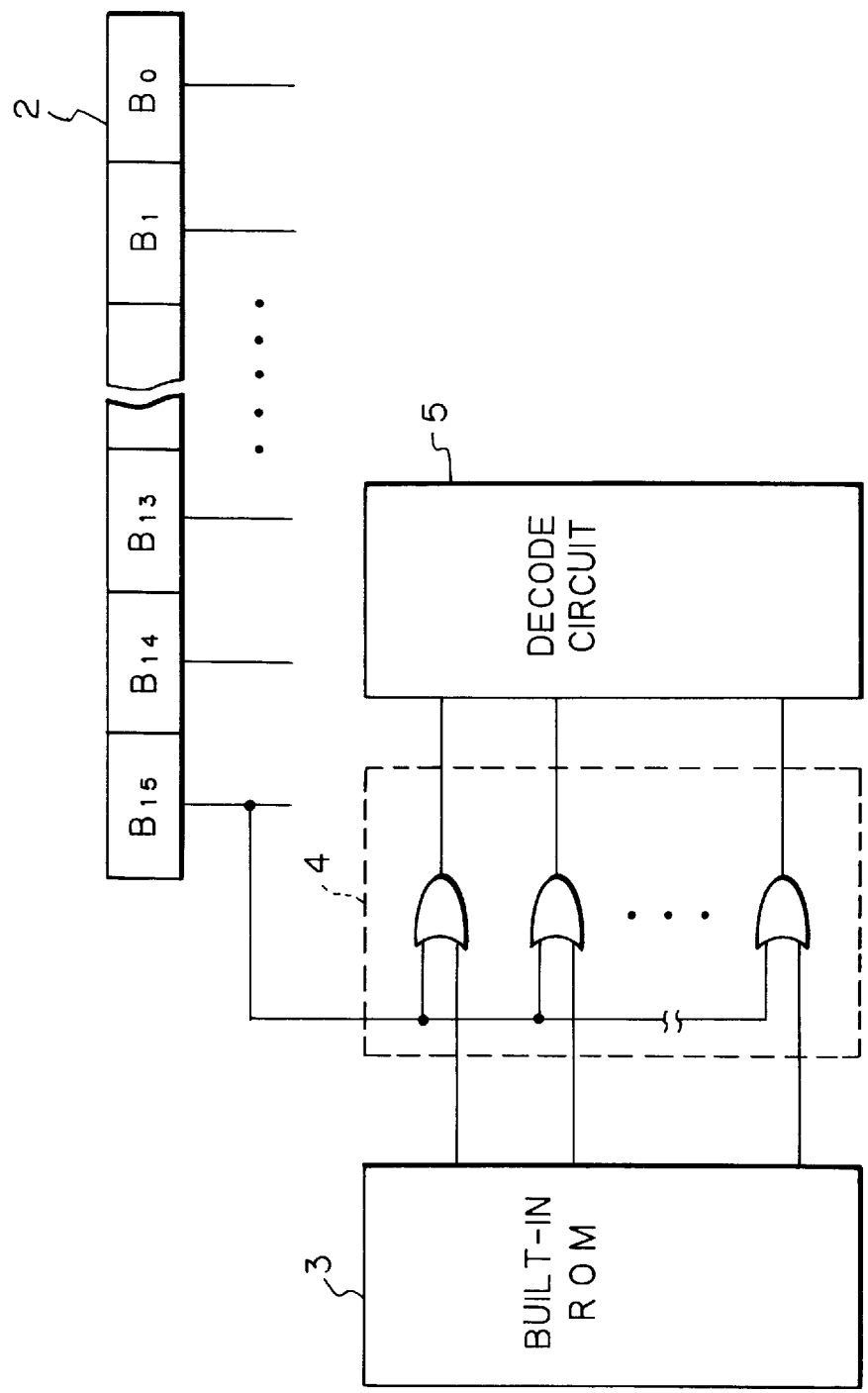
FIG. 3 is a block diagram demonstrating the operation of the embodiment.

FIG. 3 shows the gate circuit 4 specifically. As shown, the gate circuit 4 has a plurality of OR gates each receiving the inhibit signal from the program counter 2 at its one input. The other input of each OR gate is connected to the corresponding bit of the output of the built-in ROM 3. In the illustrative embodiment, the program counter 2 has sixteen bits and is capable of counting from 0000H to FFFFH (H means Hexadecimal notation). Assume that the counter 2 is so constructed as to access the inside RAM 8 when its most significant bit (MSB) is ZERO, i.e., 0000H to 7FFFH or access the outside memory when the MSB is ONE, i.e., 8000H to FFFFH. The MSB of the counter 2 is connected to the OR gates as the inhibit signal.

When the program counter 2 designates the address of the inside ROM 3, the MSB of the program counter 2 connected to one input of each OR gate is ZERO. In this condition, the output of the ROM 3 directly appears on the output of the gate circuit 4. However, when the program counter 2 designates the address of the outside memory, the MSB of the counter 2 connected to one input of each OR gate is ONE and fixes each bit of the output of the gate 4 circuit at ONE. Consequently, the gate circuit 4 prevents the output of the ROM 3 from reaching the decode circuit 5. In this manner, the access to the ROM 3 and based on a program stored in the outside memory is inhibited.

In summary, it will be seen that the present invention provides a one-chip CPU capable of protecting its built-in memory from illicit access based on the program of an outside memory. Therefore, important data stored in the built-in memory and including a decoded algorithm are protected from the third party. This unprecedented advantage is derived from a unique configuration wherein when a program counter included in the CPU designates the address of the outside memory, the access to the built-in memory is inhibited.

Various modifications will become possible for those skilled in the art after receiving the teachings of the present disclosure without departing from the scope thereof.

What is claimed is:

1. A one-chip CPU comprising:

at least a processor and a built-in memory implemented as a single package;

an external bus for connecting said processor and an outside memory;

said processor having a program counter with a MSB having a first logical value for said built-in memory and a second logical value for said outside memory; and a gate circuit comprising an OR gate connected to said processor to receive said logical values as a first input and to said built-in memory to receive data therefrom as a second input, for outputting the data from said built-in memory when said first logical value is input and to output an unchanging logical value when said second logical value is input for permitting access to said built-in memory when said MSB has said first logical value and for inhibiting access to said built-in memory when said MSB has said second logical value.

2. The one-chip CPU of claim 1, further comprising an internal bus connecting said processor to a decode circuit through said built-in memory and said gate circuit, and wherein said decode circuit is connected to said external bus to send and receive data therefrom and said built-in memory is connected to said external bus only to receive data therefrom.

3. A one-chip CPU comprising:

a built-in memory;

a bus for connecting an external memory;

a processor having a program counter with a MSB having a first logical value for said built-in memory and a second logical value for connecting said bus to the external memory, said processor being connected to said bus and to said built-in memory;

a decode circuit connected to said bus; and a gate circuit for permitting and inhibiting access to said built-in memory from said bus, said gate circuit being connected to said processor to receive said logical values as a first input, to said built-in memory to receive data therefrom as a second input, and to said decode circuit to output the data from said built-in memory when said first logical value is input and to output an unchanging logical value when said second logical value is input.

4. The one-chip CPU of claim 3, wherein said gate circuit comprises an OR gate that outputs said second logical value when said second logical value is input.

* * * * *